United States Patent
Okamura et al.

(10) Patent No.: US 11,338,253 B2
(45) Date of Patent: *May 24, 2022

(54) POROUS HOLLOW FIBER MEMBRANE, METHOD FOR PRODUCING SAME, AND WATER PURIFICATION METHOD

(71) Applicant: ASAHI KASEI KABUSHIKI KAISHA, Tokyo (JP)

(72) Inventors: Daisuke Okamura, Tokyo (JP); Yuki Miki, Tokyo (JP); Masatoshi Hashino, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 108 days.

This patent is subject to a terminal disclaimer.

(21) Appl. No.: 16/933,355

(22) Filed: Jul. 20, 2020

(65) Prior Publication Data
US 2020/0346173 A1 Nov. 5, 2020

Related U.S. Application Data

(63) Continuation of application No. 15/108,610, filed as application No. PCT/JP2014/074737 on Sep. 18, 2014, now Pat. No. 10,751,671.

(30) Foreign Application Priority Data

Jan. 10, 2014 (JP) ................ 2014-003209

(51) Int. Cl.
*B01D 71/34* (2006.01)
*B01D 69/02* (2006.01)
(Continued)

(52) U.S. Cl.
CPC ......... *B01D 71/34* (2013.01); *B01D 67/0079* (2013.01); *B01D 69/02* (2013.01);
(Continued)

(58) Field of Classification Search
CPC .. B01D 71/34; B01D 71/027; B01D 67/0079; B01D 69/088; B01D 69/148;
(Continued)

(56) References Cited

U.S. PATENT DOCUMENTS 5,022,990 A 6/1991 Doi et al.
6,165,363 A 12/2000 Oishi et al.
(Continued)

FOREIGN PATENT DOCUMENTS

CN 101282780 A 10/2008
JP 60-139815 A 7/1985
(Continued)

OTHER PUBLICATIONS

Y. Watanabe et al., "Membrane 24 (6)", , 1999, pp. 310-318.
(Continued)

*Primary Examiner* — Krishnan S Menon
(74) *Attorney, Agent, or Firm* — Greenblum & Bernstein, P.L.C.

(57) ABSTRACT

The porous hollow fiber membrane of the present invention contains a thermoplastic resin, and includes a surface having a surface porosity of 32 to 60% and a fine pore diameter of 300 nm or less, and has a compressive strength of 0.7 MPa or more. The porous hollow fiber membrane of the present invention may include at least two layers, and in this case, the surface of one layer has a thickness of backbone of 0.3 to 20 μm and a fine pore diameter of 0.3 to 10 μm, and the surface of the other layer has a surface porosity of 32 to 60% and a fine pore diameter of 0.05 to 0.3 μm.

10 Claims, 2 Drawing Sheets

(51) Int. Cl.
*B01D 69/08* (2006.01)
*B01D 69/12* (2006.01)
*C02F 1/44* (2006.01)
*B01D 67/00* (2006.01)
*B01D 69/14* (2006.01)
*B01D 71/02* (2006.01)

(52) U.S. Cl.
CPC .......... *B01D 69/08* (2013.01); *B01D 69/088* (2013.01); *B01D 69/12* (2013.01); *B01D 69/148* (2013.01); *B01D 71/027* (2013.01); *C02F 1/44* (2013.01); *B01D 2325/02* (2013.01); *B01D 2325/04* (2013.01); *B01D 2325/24* (2013.01)

(58) Field of Classification Search
CPC ........ B01D 69/02; B01D 69/08; B01D 69/12; B01D 2325/04; B01D 2325/24; B01D 2325/02; C02F 1/44
See application file for complete search history.

(56) References Cited

U.S. PATENT DOCUMENTS

| | | |
|---|---|---|
| 2003/0111416 A1 | 6/2003 | Kubota et al. |
| 2005/0205488 A1 | 9/2005 | Shinada et al. |
| 2009/0283469 A1 | 11/2009 | Ariji et al. |
| 2009/0297822 A1 | 12/2009 | Fujimura et al. |
| 2012/0085698 A1 | 4/2012 | Yang et al. |

FOREIGN PATENT DOCUMENTS

| | | |
|---|---|---|
| JP | 3-215535 A | 9/1991 |
| JP | 4-65505 A | 3/1992 |
| JP | 11-138164 A | 5/1999 |
| JP | 2007-185562 A | 7/2007 |
| JP | 2009-219979 A | 10/2009 |
| JP | 2010-227932 A | 10/2010 |
| JP | 2012-040461 A | 3/2012 |
| WO | 97/022405 A1 | 6/1997 |
| WO | 01/053213 A1 | 7/2001 |
| WO | 2004/043579 A1 | 5/2004 |
| WO | 2007/043553 A1 | 4/2007 |

OTHER PUBLICATIONS

"Plastic Kinosei Kobunshi Zairyo Jiten (Dictionary of Plastic and Functional Polymeric Materials)", Plastic Kinosei Kobunshi Zairyo Jiten Editorial Committee, Industrial Research Center of Japan, Feb. 2004, pp. 672-679.

Akira Takizawa, "Maku (Membrane)", Industrial Publishing & Consulting Inc., Jan. 1992, pp. 404-406.

Hideto Matsuyama, "Netsuyuki Sobunri-ho (TIPS-ho) niyoru Kobunshi-kei Takomaku no Sakusei (Productions of Polymer-based Porous Membrane by Thermally induced Phase Separation Method (TIPS Method) )", Chemical Engineering, Kagaku Kogyo-sha, Jun. 1998, pp. 45-46.

D.R. Lloyd et al., "Journal of Membrane Science, 64", , 1991, pp. 1-11.

Charles M. Hansen, "Hansen Solubility Parameters a User's Handbook Second Edition," CRC Press ISBN 0-8493-7248-8, 2007. 10, p. 1-p. 519.

Search Report issued in Japan Patent Application No. PCT/JP2014/074737, dated Dec. 16, 2014.

POROUS HOLLOW FIBER MEMBRANE, METHOD FOR PRODUCING SAME, AND WATER PURIFICATION METHOD

CROSS REFERENCE TO RELATED APPLICATIONS

This is a continuation application of U.S. patent application Ser. No. 15/108,610, filed Jun. 28, 2016, which is a National Phase application of International Application No. PCT/JP2014/074737, filed on Sep. 18, 2014, and claims the benefit of Japanese Patent Application No. 2014-003209, filed on Jan. 10, 2014. The entire disclosures of each of the above-identified applications, including the specification, drawings, and claims thereof, are herein incorporated by reference in their entirety.

TECHNICAL FIELD

The present invention relates to a porous hollow fiber membrane, a method for producing the same, and a water purification method using the porous hollow fiber membrane.

BACKGROUND ART

Tap water treatment is a process of obtaining drinking water or industrial water from natural water sources such as river water, lake and marsh water and underground water, which are suspended water. Sewage treatment is a process of obtaining regenerated water for miscellaneous use by treating domestic wastewater such as sewage water, or obtaining dischargeable clarified water. It is essential for these treatments to remove suspended matter by carrying out a solid-liquid separation operation (clarification operation). In the tap water treatment, suspended substances derived from natural water source (clay, colloid, bacteria, and the like) are removed. In the sewage treatment, suspended matter (sludge, and the like) in treated water that is biologically treated (secondary-treated) by suspended matter, activated sludge and the like in sewage water is removed. Conventionally, these clarification operations have been carried out mainly by a precipitation method, a sand filtration method, or a coagulation sedimentation plus sand filtration method, and recently, a membrane filtration method is spreading. Examples of the advantage of the membrane filtration method include the following matters.

(1) Clarification level of the obtained water quality is high and stable (safety of the obtained water is high).

(2) The installation space of a filtration apparatus can be small.

(3) Automatic operation is easy.

For example, in the tap water treatment, the membrane filtration method is used, as a substitute for the coagulation sedimentation plus sand filtration method, or as a means for further improving water quality of treated water subjected to coagulation sedimentation plus sand filtration, for example, by installing at a rear stage of the coagulation sedimentation plus sand filtration. Also regarding the sewage treatment, use of the membrane filtration method is studied for separation of sludge from sewage secondary treated water and the like.

In these clarification operations by membrane filtration, a hollow fiber-shaped ultrafiltration membrane or microfiltration membrane (pore diameter in a range of several nm to several hundred nm) is mainly used. As a filtration system using a hollow fiber filtration membrane, there are two systems: an inner pressure filtration system that filters from an inner surface side towards an outer surface side of a membrane; and an external pressure filtration system that filters from an outer surface side towards an inner surface side. Among them, the external pressure filtration system that can take large membrane surface area on the side in contact with the suspended raw water and thus can reduce the suspended matter load amount per unit membrane surface area is advantageous. Patent Literatures 1 to 3 disclose a hollow fiber and a method for producing the same.

Clarification by a membrane filtration method has many advantages that conventional precipitation method and sand filtration method do not have as described above, thus, spread to a tap water treatment and a sewage treatment is progressing as a substitute technology or complementary technology of a conventional method. However, a technology for performing stable membrane filtration operation has not been established over a long period of time, and it inhibits wide spread of the membrane filtration method (refer to Non Patent Literature 1). The cause of disturbing the stability of membrane filtration operation is mainly deterioration in water permeability. First cause of deterioration in water permeability is clogging (fouling) of membrane due to suspended substances and the like (refer to Non Patent Literature 1). Also, the membrane surface was rubbed by suspended substance to be abraded, and it sometimes causes deterioration in water permeability.

Incidentally, as a method for producing porous membrane, a thermally induced phase separation method is known. In this production method, a thermoplastic resin and an organic liquid are used. As the organic liquid, a solvent that does not dissolve the thermoplastic resin at room temperature, but dissolves it at high temperature, specifically, a potential solvent is used. The thermally induced phase separation method is a method for producing a porous body by kneading a thermoplastic resin and an organic liquid at high temperature to dissolve the thermoplastic resin in the organic liquid, then cooling the solution to room temperature to induce phase separation, and further removing the organic liquid. This method has the following advantages.

(a) It becomes possible to form a membrane even with a polymer such as polyethylene in which there is no appropriate solvent that can be dissolved at room temperature.

(b) A membrane is formed by being dissolved at high temperature then cooled and solidified, thus particularly when the thermoplastic resin is a crystalline resin, crystallization is promoted during membrane formation, and a high strength membrane is likely to obtain.

Based on the above advantages, this production method has been often used as a method for producing a porous membrane (for example, refer to Non Patent Literatures 2 to 5).

CITATION LIST

Patent Literatures

Patent Literature 1: JP 60-139815 A
Patent Literature 2: JP 3-215535 A
Patent Literature 3: JP 4-065505 A
Patent Literature 4: WO 2007/043553 A1
Patent Literature 5: WO 2004/043579 A1

Non Patent Literatures

Non Patent Literature 1: Y. Watanabe, R. Bian, Membrane, 24(6), 1999, pp. 310-318
Non Patent Literature 2: Plastic Kinosei Kobunshi Zairyo Jiten Editorial Committee, "Plastic Kinosei Kobunshi Zairyo Jiten (Dictionary of Plastics and Functional Polymeric Materials)" Industrial Research Center of Japan, February 2004, pp. 672-679
Non Patent Literature 3: Hideto Matsuyama, "Netsuyuki Sobunri-ho (TIPS-ho) niyoru Kobunshi-kei Takomaku no Sakusei (Production of Polymer-based Porous Membrane by Thermally Induced Phase Separation Method (TIPS Method)", Chemical Engineering, 1998 June issue, pp. 45-56, published by Kagaku Kogyo-sha
Non Patent Literature 4: Akira Takizawa, "Maku (Membrane)", issued in January 1992, pp. 404-406, published by Industrial Publishing & Consulting Inc.
Non Patent Literature 5: D. R. Lloyd, et. al., "Journal of Membrane Science", 64, 1991, pp. 1-11

SUMMARY OF INVENTION

Technical Problem

An object of the present invention is to provide a porous hollow fiber membrane capable of maintaining sufficiently high filtering capacity over a long period of time. More specifically, an object of the present invention is to provide, in a method for clarifying suspended water that is natural water, domestic wastewater, and treated water thereof, by a membrane filtration method, a membrane filtration clarification method that is less deterioration in water permeability due to clogging of a membrane, and also less deterioration in water permeability due to abrasion of a membrane surface, and excellent in filtration stability, and a porous hollow fiber membrane showing a high compressive strength.

Solution to Problem

The present inventors have intensively worked to solve the above problem, and consequently found that the outer surface porosity of a porous hollow fiber membrane is increased, and deterioration in water permeability due to clogging and deterioration in water permeability due to abrasion of a membrane surface are suppressed, whereby a porous hollow fiber membrane that is excellent in filtration stability and provides high water permeating amount is obtained. Also, it was found that the thickness of backbone constituting the inner surface is increased, whereby a membrane showing a high compressive strength is obtained. As a result, the present invention has been completed.

Conventionally, it was known that a membrane having a high outer surface porosity is used in filtration, thereby suppressing deterioration in water permeability due to clogging (WO 2001/053213 A1). In addition, abrasion of a membrane surface is mainly caused, not during filtration operation, but when peeling the suspended matter deposited on the outer membrane surface by external pressure type filtration from the outer membrane surface by air cleaning and the like. However, also because this phenomenon itself is not known well, a technology corresponding to deterioration in water permeability due to membrane surface abrasion is not much developed. JP 11-138164 A merely discloses a use of a membrane having a high breaking strength, as a means of suppressing change of membrane performance due to air bubbling cleaning. The present inventor has found that, against deterioration in water permeability due to membrane surface abrasion, the outer surface porosity is increased to 32% or more, and a membrane is formed, whereby deterioration of water permeability can be suppressed. Also, it was found that the thickness of backbone constituting the inner surface is controlled to 0.3 μm or more and 50 μm or less, thereby showing a high compressive strength.

The present invention provides the following invention.
[1] A porous hollow fiber membrane containing a thermoplastic resin, including a surface having a surface porosity of 32 to 60% and a fine pore diameter of 300 nm or less, wherein the porous hollow fiber membrane has a compressive strength of 0.7 MPa or more.
[2] The porous hollow fiber membrane according to [1], wherein the porous hollow fiber membrane contains a thermoplastic resin and includes at least two layers, and the surface of one layer has a thickness of backbone of 0.3 to 20 μm and a fine pore diameter of 0.3 to 10 μm, and the surface of other layer has a surface porosity of 32 to 60% and a fine pore diameter of 0.05 to 0.3 μm.
[3] The porous hollow fiber membrane according to [2], wherein the fine pores of the surface of the one layer have an aspect ratio of 4 or more.
[4] The porous hollow fiber membrane according to [2], wherein the fine pores of the surface of the one layer have an aspect ratio of 10 or more.
[5] The porous hollow fiber membrane according to any one of [2] to [4], wherein the one layer has a porosity of 50 to 65%, and the other layer has a porosity of 65 to 80%.
[6] A method for producing the porous hollow fiber membrane as defined in [5], wherein the melt kneaded product when producing the one layer has a concentration of the thermoplastic resin of 37 to 45% by mass, and the melt kneaded product when producing the other layer has a concentration of the thermoplastic resin of 20 to 35% by mass.
[7] The production method according to [6], wherein the raw material is three components of a thermoplastic resin, inorganic fine powder, and a solvent.
[8] The production method according to [7], wherein the inorganic fine powder having a primary particle diameter of 10 nm or more is used when producing the one layer, and the inorganic fine powder having a primary particle diameter of 20 nm or less is used when producing the other layer.
[9] The production method according to [7], wherein the inorganic fine powder having a primary particle diameter of 20 nm or more is used when producing the one layer, and the inorganic fine powder having a primary particle diameter of less than 20 nm is used when producing the other layer.
[10] The production method according to [7], wherein the inorganic fine powder having a primary particle diameter of 20 nm or more is used when producing the one layer, and the inorganic fine powder having a primary particle diameter of 10 nm or less is used when producing the other layer.
[11] The method for producing a porous hollow fiber membrane including at least two layers according to any one of [7] to [10], including discharging a melt-kneaded raw material resin from a spinning orifice nozzle when forming a membrane, and then cooling and solidifying it with taking an idle running time of 1 second or more.
[12] The production method according to any one of [7] to [11], wherein a braid is used as the one layer.
[13] The production method according to any one of [7] to [12], wherein the inorganic fine powder is silica.

[14] The production method according to any one of [6] to [13], wherein the thermoplastic resin is polyvinylidene fluoride (PVDF).

[15] The production method according to [14], wherein a solvent satisfying the conditions of a three-dimensional solubility parameter represented by the following equation is used when producing the one layer:

$$((\sigma_{dm}-\sigma_{dp})^2+(\sigma_{pm}-\sigma_{pp})^2+(\sigma_{hm}-\sigma_{hp})^2)^{1/2} \leq 7.8$$

wherein $\sigma_{dm}$ and $\sigma_{dp}$ represent dispersion force terms of solvent and polyvinylidene fluoride, respectively, $\sigma_{pm}$ and $\sigma_{pp}$ represent dipole bonding force terms of solvent and polyvinylidene fluoride, respectively, and $\sigma_{hm}$ and $\sigma_{hp}$ represent hydrogen bond terms of solvent and polyvinylidene fluoride, respectively.

[16] The production method according to [14] or [15], wherein a solvent satisfying the conditions of a three-dimensional solubility parameter represented below is used when producing the other layer:

$$((\sigma_{dm}-\sigma_{dp})^2(\sigma_{pm}-\sigma_{pp})^2+(\sigma_{hm}-\sigma_{hp})^2)^{1/2} > 7.8$$

wherein $\sigma_{dm}$ and $\sigma_{dp}$ represent dispersion force terms of solvent and polyvinylidene fluoride, respectively, $\sigma_{pm}$ and $\sigma_{pp}$ represent dipole bonding force terms of solvent and polyvinylidene fluoride, respectively, and $\sigma_{hm}$ and $\sigma_{hp}$ represent hydrogen bond terms of solvent and polyvinylidene fluoride, respectively.

[17] A water purification method including a step of filtering suspended water using the porous hollow fiber membrane as defined in any one of [1] to [5].

Advantageous Effects of Invention

According to the present invention, a porous hollow fiber membrane capable of maintaining stable filtering capacity over a sufficiently long period of time can be provided.

DESCRIPTION OF EMBODIMENTS

Embodiments of the present invention will be described in detail. The present invention is not limited to the following embodiments.

<Porous Hollow Fiber Membrane>

Figure 1:
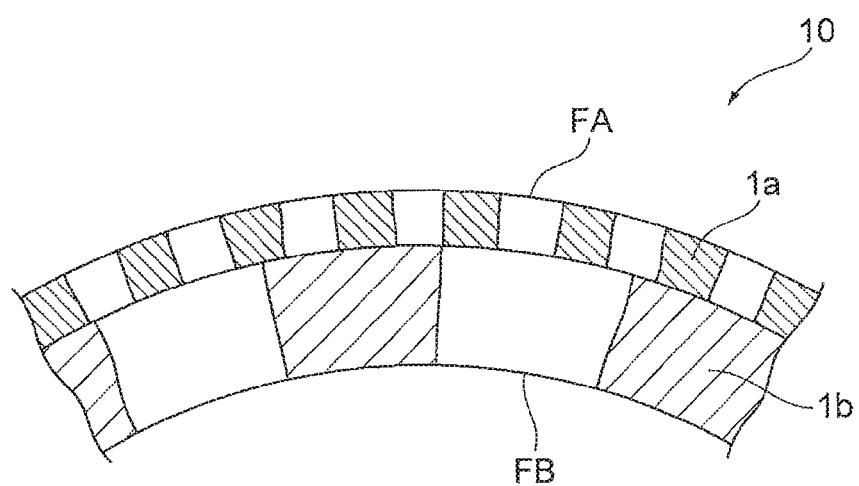
FIG. 1 is a schematic cross sectional view showing an embodiment of a porous hollow fiber membrane.

FIG. 1 schematically shows a cross section of the porous hollow fiber membrane according to the present embodiment. A porous hollow fiber membrane 10 shown in FIG. 1 has a two layer structure, and includes a layer (other layer) 1a having an outermost surface FA and a layer (one layer) 1b having an outermost surface FB. Both of these layers 1a and 1b contain a thermoplastic resin. The layers 1a and 1b may contain components other than thermoplastic resin (impurities, and the like) in an amount up to about 5% by mass.

Figure 2:
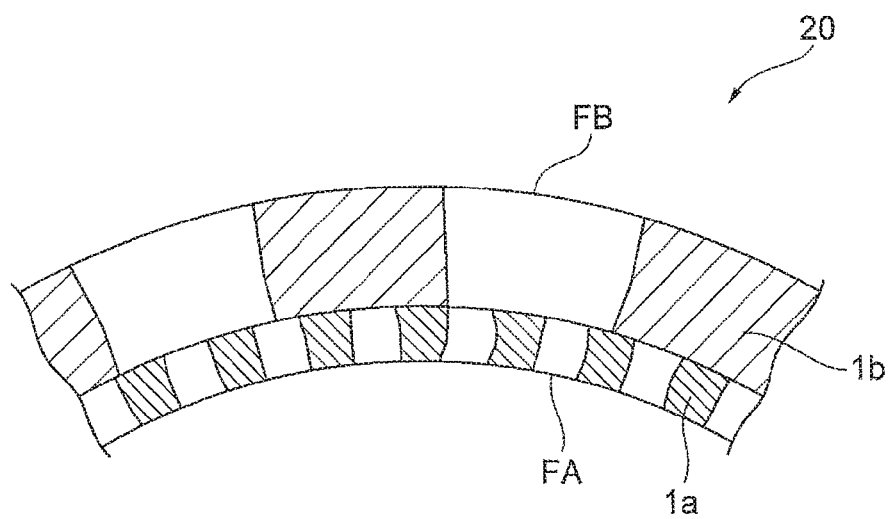
FIG. 2 is a schematic cross sectional view showing other embodiment of a porous hollow fiber membrane.

Here, while the porous hollow fiber membrane of a two layer structure is exemplified, it may be a single layer structure, and may be a multi-layer structure of three layers or more, so long as the conditions of the above surface porosity and the like are satisfied. In addition, while a case where the surface FA is arranged outside and the surface FB is arranged inside is exemplified, on the premise that an external pressure filtration system is adopted herein, the arrangement of these surfaces may be reversed, as a porous hollow fiber membrane 20 shown in FIG. 2. More specifically, the porous hollow fiber membrane 20 has a two layer structure, and includes a layer (one layer) 1b having an outermost surface FB and a layer (other layer) 1a having an outermost surface FA.

The suspended water to be treated is natural water, domestic wastewater, treated water thereof, and the like. Examples of natural water include river water, lake and marsh water, underground water, and sea water. Treated water of natural water, that is natural water subjected to a treatment such as sedimentation treatment, sand filtration treatment, coagulation sedimentation plus sand filtration treatment, ozone treatment or activated carbon treatment, is also included in the suspended water to be treated. An example of domestic wastewater is sewage water. A primary treated water of sewage water, that is sewage water subjected to screening filtration or sedimentation treatment, a secondary treated water of sewage water having been subjected to bioprocess treatment, and further a tertiary treated (highly treated) water of sewage water having been subjected to coagulation sedimentation plus sand filtration treatment, activated carbon treatment or ozone treatment, are also included in the suspended water to be treated. Suspended water containing fine organic matters, inorganic matters and mixtures thereof, with a size of not larger than μm order (such as humus colloid, organic colloid, clay and bacteria) are contained in these suspended water. The porous hollow fiber membranes 10 and 20 are used in the water purification method including a step of filtering suspended water.

Water quality of the suspended water (the above-described natural water, domestic wastewater, treated water thereof, and the like) can be generally expressed by typical indices of water quality, turbidity and concentration of organic matters, either alone or in combination thereof. Water quality is roughly classified by turbidity (not an instantaneous turbidity but an average turbidity) into low turbid water with a turbidity of less than 1, medium turbid water with a turbidity of not less than 1 but less than 10, high turbid water with a turbidity of not less than 10 but less than 50, and ultra-high turbid water with a turbidity of not less than 50. Water quality is also roughly classified by concentration of organic matters (Total Organic Carbon (TOC): mg/L) (also not an instantaneous value but an average value) into low TOC water with a TOC of less than 1, medium TOC water with a TOC of not less than 1 but less than 4, high TOC water with a TOC of not less than 4 but less than 8, and ultra-high TOC water with a TOC of not less than 8. Basically, water with higher turbidity or TOC is more likely to clog filtration membrane and thus the effects of using the porous hollow fiber membranes 10 and 20 become greater for the water with higher turbidity or TOC.

The material constituting the porous hollow fiber membranes 10 and 20 is a polyolefin, a copolymer of olefin and halogenated olefin, a halogenated polyolefin, or a mixture thereof. Examples include polyethylene, polypropylene, polyvinyl alcohol, ethylene-vinyl alcohol copolymer, ethylene-tetrafluoroethylene copolymer, polyvinylidene fluoride, and mixtures thereof. These materials are superior as a membrane material because they are easy to handle due to being thermoplastic and have sufficient toughness. Among these, polyethylene, polypropylene, polyvinylidene fluoride and mixtures thereof are preferable due to having superior mechanical strength and chemical strength (chemical resistance), as well as good moldability.

From a practical viewpoint, the porous hollow fiber membranes 10 and 20 have a compressive strength of 0.7 MPa or more, preferably 0.7 to 1.0 MPa, and further preferably 0.8 to 1.0 MPa.

The porous hollow fiber membranes 10 and 20 have a surface porosity of the surface FA of 32 to 60%, preferably 32 to 50%, and further preferably 35 to 45%. A membrane having a surface porosity of the surface FA in the side in contact with the suspended water of 32% or more is used for filtration, whereby deterioration in water permeability due to clogging and deterioration in water permeability due to abrasion of a membrane surface are both reduced, and filtration stability can be enhanced. However, even when the surface porosity is high, in a case where the pore diameter is large, the above-described TOC component permeates a membrane, and water quality of filtered water is deteriorated. Therefore, the fine pore diameter on the surface FA is 300 nm or less, preferably 70 to 200 nm, and more preferably 100 to 200 nm. When the fine pore diameter is 300 nm or less, direct transfer of the TOC components contained in the suspended water can be sufficiently suppressed, and when the pore diameter is 70 nm or more, sufficiently high water permeability can be secured.

The porosity of the layer (other layer) 1a is preferably 65 to 80%, and more preferably 65 to 75%. When the porosity is less than 65%, water permeability is likely to deteriorate, on the other hand, when the porosity exceeds 80%, mechanical strength is likely to deteriorate.

The thickness of the layer 1a is preferably 1 to 100 μm, and more preferably 5 to 30 μm. When the thickness is less than 1 μm, a pin hole is likely to be formed in the layer 1a, on the other hand, when the thickness exceeds 100 μm, pressure loss due to membrane resistance is likely to increase.

From a viewpoint of improvement in compressive strength, the thickness of backbone constituting the surface (surface of one layer) FB in the side in contact with the filtered water is preferably 0.3 to 20 μm, preferably 0.3 to 10 and more preferably 0.8 to 10 μm. The "thickness of backbone" herein used refers to a value calculated by the following method. First, with a scanning electron microscope, a photograph of the outer surface of the hollow fiber membrane was taken from a direction vertical to the outer surface at a magnification at which the shapes of pores as many as possible can be clearly observed (approximately 1000 times or lower). Next, a distance between pores in a direction vertical to the longitudinal direction of the hollow fiber membrane was defined as the thickness of backbone of the polymer, and in the image, one in which the thickness of backbone was considered to be thick was measured with priority, and the maximum value was referred to as the thickness of backbone of the polymer on the surface pore.

The porous hollow fiber membranes 10 and 20 has a surface porosity of the surface FB of preferably 25 to 35%, more preferably 25 to 32%, and further preferably 25 to 30%. The fine pore diameter on the surface FB is preferably 0.3 to 10 μm, more preferably 0.5 to 5 μm, and further preferably 0.5 to 3 μm. When the fine pore diameter is less than 0.3 μm, water permeability is likely to deteriorate, on the other hand, when the pore diameter exceeds 10 μm, mechanical strength is likely to deteriorate.

The porosity of the layer (one layer) 1b is preferably 50 to 65%, and more preferably 55 to 65%. When the porosity is less than 50%, water permeability is likely to deteriorate, on the other hand, when the porosity exceeds 65%, mechanical strength is likely to deteriorate.

The thickness of the layer 1b is preferably 100 to 400 μm, and more preferably 100 to 250 μm. When the thickness is less than 100 μm, mechanical strength is likely to deteriorate, on the other hand, when the thickness exceeds 400 μm, membrane resistance is likely to be large.

<Method for Producing Porous Hollow Fiber Membrane>

A method for producing the porous hollow fiber membranes 10 and 20 will be described. The production method according to the present embodiment includes the steps of (a) each preparing melt-kneaded product A and melt-kneaded product B and (b) feeding these melt-kneaded products A and B to a spinning nozzle having a multiple structure, and extruding the melt-kneaded products A and B from the spinning nozzle, thereby obtaining a hollow fiber membrane. Here, the melt-kneaded product A is for preparing the layer 1a, and the melt-kneaded product B is for preparing the layer 1b.

The concentration of a thermoplastic resin of the melt-kneaded product A is preferably 20 to 35% by mass, more preferably 25 to 35% by mass, and further preferably 30 to 35% by mass. When this value is less than 20% by mass, mechanical strength is likely to deteriorate, on the other hand, when this value exceeds 35% by mass, water permeability is likely to deteriorate.

The concentration of a thermoplastic resin of the melt-kneaded product B is preferably 37 to 45% by mass, and preferably 40 to 45% by mass. When this value is less than 37% by mass, mechanical strength is likely to deteriorate, on the other hand, when this value exceeds 45% by mass, water permeability is likely to deteriorate.

Both of the melt-kneaded product A and the melt-kneaded product B may contain two components: a thermoplastic resin and a solvent, and also may contain three components: a thermoplastic resin, an inorganic fine powder, and a solvent. When inorganic fine powder is used, the primary particle diameter of the inorganic fine powder contained in the melt-kneaded product A is preferably 20 nm or less, and more preferably 5 nm or more and less than 20 nm. The primary particle diameter of the inorganic fine powder contained in the melt-kneaded product B is preferably 20 nm or more, and more preferably 20 to 50 nm. When a melt-kneaded product not containing inorganic fine powder is used, the hollow fiber membrane obtained via the step (b) may be used as the porous hollow fiber membrane 10 or the porous hollow fiber membrane 20. When the porous hollow fiber membranes 10 and 20 are produced using a melt-kneaded product containing inorganic fine powder, the production method according to the present embodiment preferably further includes, after the step (b), a step of extracting and removing inorganic fine powder from the hollow fiber membrane to obtain the porous hollow fiber membrane 10 or the porous hollow fiber membrane 20.

Specific examples of the inorganic fine powder include silica fine powder, titanium oxide, lithium chloride, and the like, and among them, silica fine powder is preferred from the viewpoint of cost. The "primary particle diameter of the inorganic fine powder" described above means a value obtained from the analysis of an electron microscope photograph. Specifically, first, a group of the inorganic fine powder is pretreated by a method of ASTM D3849. Thereafter, the diameters of 3000 to 5000 particles in a photograph taken with a scanning electron microscope are measured, and these values are arithmetically averaged to calculate the primary particle diameter of the inorganic fine powder.

In order to obtain a layer 1b satisfying predetermined requirements (a thickness of backbone on the surface of 0.3 to 20 μm and a fine pore diameter on the surface of 0.3 to 10 μm), at least one of the following three means should be adopted.

Means 1: Use inorganic fine powder with comparatively large particle diameter (for example, an average particle size of 20 nm or more).

Means 2: Discharge a melt-kneaded raw material resin from a spinning orifice nozzle when forming a membrane, and then cool and solidify it with taking an idle running time of 1 second or more. The melt-kneaded product is discharged from a spinning nozzle (spinning orifice nozzle), and then goes through a predetermined idle running distance, and cooled and solidified in a spinning bath. At this time, when the idle running time is maintained for 1 second or more, polymer molecules are oriented in the idle running section, so that the compressive strength can be enhanced. The upper limit of the idle running time should be about 1.5 seconds.

Means 3: Use a braid made of resin (for example, made of polyester) or made of metal (for example, made of stainless steel) as the layer 1b.

Deterioration in water permeability due to abrasion is considered to be caused mainly by crushing of fine pores on the membrane surface by rubbing of adjacent membranes. The present inventors have found that, the surface porosity of the outermost surface (surface FA) of the porous hollow fiber membrane 10 is set to 32 to 60%, whereby the fine pore shape on the membrane surface can be maintained without crushing fine pores even when adjacent membranes are rubbed each other. Usually, when attempting to form a membrane having a surface porosity of 32% or more as described above, it is difficult to enhance the compressive strength to a practically necessary strength by a phase separation method.

For example, Patent Literature 4 discloses a method for laminating a strength support layer to a high water permeable high surface porosity layer. In the production method disclosed in Patent Literature 4, it is necessary to properly select a solvent for PVDF (polyvinylidene fluoride), in order to satisfy both high surface porosity and compressive strength by PVDF. Specifically, while a method for forming a membrane by lowering PVDF concentration is used for high surface porosity, pore diameter also becomes large. Therefore, it is preferred to select a solvent that can achieve high surface porosity and small pore diameter, and preferred to satisfy the following equation when shown by a three-dimensional solubility parameter:

$$P=(\sigma_{dm}-\sigma_{dp})^2+(\sigma_{pm}-\sigma_{pp})^2+(\sigma_{hm}-\sigma_{hp})^2$$

wherein $\sigma_{dm}$ and $\sigma_{dp}$ represent dispersion force terms of solvent and polyvinylidene fluoride, respectively, $\sigma_{pm}$ and $\sigma_{pp}$ represent dipole bonding force terms of solvent and polyvinylidene fluoride, respectively, and $\sigma_{hm}$ and $\sigma_{hp}$ represent hydrogen bond terms of solvent and polyvinylidene fluoride, respectively.

Three-dimensional solubility parameter PA of the solvent used in the preparation of the melt-kneaded product A is preferably more than 7.8, more preferably 7.8 to 10, and further preferably 7.8 to 9.0. When this value is 7.8 or less, water permeability is likely to deteriorate.

Three-dimensional solubility parameter PB of the solvent used in the preparation of the melt-kneaded product B is preferably 7.8 or less, more preferably 0 to 7.8, and further preferably 3.0 to 7.8. When this value exceeds 7.8, water permeability is likely to deteriorate.

For example, in a combination of di(2-ethylhexyl)phthalate (DEHP) and dibutyl phthalate (DBP), the value of three-dimensional solubility parameter of a mixed solvent of DEHP:DBP=3:1 (mass ratio) is 7.77. Both pore diameter and surface porosity can be satisfied by using this mixed solvent. As long as a solvent having sufficiently high affinity with PVDF, the kind of the solvent is not only the above-described combination, but also various solvents can be properly used.

Patent Literature 5 discloses a method for coating a membrane separation layer on a braid. When this method is adopted, a double structure spinning nozzle is used to pass the molten resin membrane-forming stock solution as mentioned above through an outer tube and pass a braid through an inner tube, and perform spinning. The braid is taken out with the discharge of the resin, then a membrane coated with the membrane separation layer can be obtained. Whereby, a membrane satisfying both high surface porosity and high compressive strength can be obtained.

Hereinbelow, the present invention will be described in detail with reference to examples, but the present invention is not limited to these examples. Each of physical values in examples and comparative examples was obtained by the following method.

1) Surface porosity, porosity, pore diameter and aspect ratio: electron microscope (SEM) images of the surface and cross section of the membrane at an accelerating voltage of 3 kV were taken at 5000 times, using an electron microscope SU8000 series manufactured by Hitachi, Ltd. An electron microscope sample of the cross section was obtained by cutting a frozen membrane sample in round slices in ethanol. Next, using an image analysis software Winroof 6.1.3, "noise removal" of the SEM image was performed at a numerical value of "6", and further, binarization was performed at a "threshold value: 105" by binarization using a single threshold value. The occupancy area of the binary image obtained thereby was obtained, whereby surface porosities and porosities of the membrane surface and cross section were respectively obtained.

Pore diameter means, for the pores present on the surface, the diameter of the pore up to which the sum of the pore areas reaches 50% of the total sum of the areas of all the pores when adding up the areas of the pores in order of pore diameter.

Major axis and minor axis of the fine pores were measured, and aspect ratio of the pores was calculated as (major axis)/(minor axis). Changing magnification with its pore diameter, the pores are observed at magnifications of 1000 to 10000 in a case of 500 nm or less, and set at magnifications of 1000 or less in a case of 500 nm or more. The aspect ratio to be maximized in the image was obtained, and the value was referred to as the aspect ratio of the surface pore.

2) Pore diameter in a minimum pore diameter layer: the average pore diameter in a minimum pore diameter layer was obtained as below, in accordance with ASTM:F316-86. Specifically, a relationship between a differential pressure applied to a membrane and a flow rate of air permeating through the membrane was measured in the case where the membrane was dry and the case where the membrane was wet with a liquid, by a bubble point method (ASTM F316-86, JIS K3832) using a fine-pore-size distribution measuring device or the like. The resulting graphs were respectively referred to as a dry curve and a wet curve. When a differential pressure at an intersection of the curve that represented ½ of the flow rate of the dry curve and the wet curve was denoted by P (Pa), the value of d (nm) calculated by the following formula was referred to as the average pore diameter in a minimum pore diameter layer:

$$d = c\gamma/P$$

wherein c is a constant and γ is a surface tension (dynes/cm) of the liquid.

3) Pure water flux: a hollow fiber membrane with a length of about 10 cm was immersed in ethanol and then several times in pure water repeatedly. The wet hollow fiber membrane was sealed in one end, and an injection needle was inserted into a hollow section in the other end. Pure water at 25° C. was injected into a hollow part under a pressure of 0.1 MPa at 25° C. of ambient temperature, and the amount of pure water permeated from the outer surface was measured to determine a pure water flux by the following equation:

Pure water flux [L/m$^2$/h]=60×(amount of permeated water [L])/[π×(outer diameter of membrane [m])×(effective length of membrane [m])×(measurement time [min])]

wherein, an effective length of membrane refers to a net membrane length excluding a portion into which an injection needle is inserted.

4) Compressive strength of porous hollow fiber membrane: one end of a wet hollow-fiber membrane with a length of about 5 cm was sealed with the other end open to air, and the outer surface was compressed with pure water at 40° C. to allow permeated water to flow out through the air open end. At this point, a system in which the whole water supplied to the membrane was filtered without circulating, namely, a dead end filtration system, was employed. The compressive pressure was increased from 0.1 MPa in increments of 0.01 MPa, and each pressure was retained for 15 seconds, so as to sample permeated water flowing out from the air open end during this 15 seconds. Before the hollow portion of the hollow-fiber membrane is crushed, the absolute value of the amount (mass) of permeated water is increased as the compressive pressure is increased, but when the compressive pressure exceeds the compressive resistance strength of the hollow-fiber membrane, the hollow portion is crushed and starts to be blocked; therefore, although the compressive pressure is increased, the absolute value of the amount of permeated water is lowered. A compressive pressure at which the absolute value of the amount of permeated water was the maximum was referred to as the compressive strength.

5) HSP distance (three-dimensional solubility parameter): three-dimensional solubility parameter was obtained from the following full form. Hansen, Charles (2007). Hansen Solubility Parameters: A user's handbook, Second Edition. Boca Raton, Fla.: CRC Press. (ISBN 978-0-8493-7248-3)

6) Water permeability retention upon filtration of suspended water: this is an index for determining the degree of deterioration in water permeability due to clogging (fouling). A wet hollow fiber membrane obtained by being immersed in ethanol and then several times in pure water repeatedly was filtered at an effective length of membrane of 11 cm by an external pressure system. First, pure water was filtered at a filtration pressure that permeates 10 m$^3$ per day per 1 m$^2$ of the outer membrane surface area to collect permeated water for 2 minutes, and the amount was referred to as an amount of initial permeated water of pure water. Subsequently, river surface water (surface water of the Fuji river: turbidity of 2.2, TOC concentration of 0.8 ppm), that is natural suspended water, was filtered at the same filtration pressure when measuring the amount of initial permeated water of pure water for 10 minutes to collect permeated water for 2 minutes from 8 minutes to 10 minutes of filtration, and the amount was referred to as an amount of permeated water at filtering suspended water. The water permeability retention upon filtration of suspended water was defined by the following formula. The operations were all performed at 25° C., and a membrane surface linear velocity of 0.5 m/sec.

Water permeability retention upon filtration of suspended water [%]=100×(amount of permeated water at filtering suspended water [g])/(amount of initial permeated water of pure water [g])

Each parameter in the formula is calculated by the following formula.

Filtration pressure={(inlet pressure)+(outlet pressure)}/2

Outer membrane surface area [m$^2$]=π×(fiber outer diameter [m])×(effective length of membrane [m])

Membrane surface linear velocity [m/s]=4×(amount of circulating water [m$^3$/s])/{[π×(tube diameter [m])$^2$-π×(outer diameter of membrane [m])$^2$}

In this measurement, the filtration pressure of suspended water was set at a filtration pressure at which initial water permeability of pure water (that is also water permeability at the start point of filtration of suspended water) permeates 10 m$^3$ per day per 1 m$^2$ of the outer membrane surface area, not the same among membranes. This is because, in the actual tap water treatment and sewage treatment, a membrane is usually used in a fixed amount filtering operation (filtering operation system by adjusting filtration pressure so as to obtain a certain amount of filtered water within a fixed time), thus also in this measurement, deterioration in water permeability is allowed to be compared in the conditions close to the conditions of the fixed amount filtering operation as much as possible, within the range of the measurement using one hollow fiber membrane.

7) Membrane surface abrasion resistance rate: this is an index for determining the degree of deterioration in water permeability due to membrane surface abrasion. A wet hollow fiber membrane obtained by being immersed in ethanol and then several times in pure water repeatedly was arranged on a metal plate, and suspended water in which minute sand (particle size of 130 μm: Fuji Brown FRR #120) was suspended in water in 20% by mass was injected at a pressure of 0.07 MPa from a nozzle set at 70 cm above the membrane to spray the suspended water on the outer membrane surface. After spraying for 10 minutes, the membrane was turned over, and the suspended water was again sprayed for 10 minutes. Pure water flux was measured before and after spraying, and a membrane surface abrasion resistance rate was obtained by the following formula.

Membrane surface abrasion resistance rate [%]=100× (Pure water flux after spraying)/(Pure water flux before spraying)

Example 1

A triple structure spinning nozzle was used to obtain a porous membrane of Example 1 having a membrane structure of two-layer hollow fiber membrane having an outer layer and an inner layer. As the melt-kneaded product for the outer layer, a melt-kneaded product of 34% by mass of vinylidene fluoride homopolymer having a weight average molecular weight of 240,000 as PVDF resin (manufactured by KUREHA CORPORATION, KF-W #1000), 25.4% by mass of silica fine powder (primary particle diameter: 16 nm), 27.1% by mass of bis(2-ethylhexyl)phthalate and 13.5% by mass of dibutyl phthalate was prepared.

As the melt-kneaded product for the inner layer, a melt-kneaded product of 40% by mass of vinylidene fluoride homopolymer (manufactured by KUREHA CORPORATION, KF-W #1000), 31.3% by mass of bis(2-ethylhexyl) phthalate, 5.7% by mass of dibutyl phthalate and 23% by mass of silica fine powder was prepared. Air was used as a hollow space-forming fluid. The melt-kneaded products for the outer layer and the inner layer and air were discharged at the same time at 240° C. from a triple circular spinning nozzle (outer layer outermost diameter of 2.0 mm, inner layer outermost diameter of 1.8 mm, hollow space-forming layer outermost diameter of 0.9 mm) to obtain a hollow fiber molded article.

The extruded hollow fiber molded article was passed through an idle running distance of 200 mm, then thermally induced phase separation was allowed to proceed in water at 30° C. The phase-separated hollow fiber molded article was taken out at a rate of 20 m/min, and stretched at a rate of 40 m/min with sandwiched by a belt, then relaxed at a rate of 30 m/min while hot air at 140° C. was blown in, and wound on a skein. The resulting two-layer hollow fiber extruded article was immersed in isopropyl alcohol, and bis(2-ethylhexyl)phthalate and dibutyl phthalate was extracted and removed. Subsequently, the hollow fiber membrane was immersed in water for 30 minutes to be swollen. Then, the hollow fiber membrane was immersed in a 20% by mass aqueous NaOH solution at 70° C. for 1 hour, and further, water washing was repeated, and silica fine powder was extracted and removed.

Composition, production conditions and various properties of the resulting porous membrane of Example 1 are shown in Table 1.

Example 2

A membrane was formed in the same manner as in Example 1, except for changing the particle diameter of silica fine powder in the inner layer to 30 nm and changing to 30.8% by mass of bis(2-ethylhexyl)phthalate and 6.2% by mass of dibutyl phthalate, to obtain a hollow fiber membrane of Example 2. Composition, production conditions and various properties of the resulting porous membrane of Example 2 are shown in Table 1.

Example 3

A membrane was formed in the same manner as in Example 2, except for changing the particle diameter of silica fine powder in the outer layer to 7 nm, to obtain a hollow fiber membrane of Example 3. Composition, production conditions and various properties of the resulting porous membrane of Example 3 are shown in Table 1.

Example 4

A double structure spinning nozzle (outer circular outermost diameter of 2 mm, inner circular outermost diameter of 1.8 mm) was used to extrude the component that was the same as the outer layer of Example 3 to an outer peripheral pipe. A braid made of polyester was used to pass it through a center pipe, taken out at a rate of 20 m/min to form a membrane, and passed through an idle running distance of 200 mm, then non-solvent induced phase separation was allowed to proceed in water at 30° C. The resulting two-layer hollow fiber extruded article was immersed in isopropyl alcohol, and bis(2-ethylhexyl)phthalate and dibutyl phthalate was extracted and removed. Subsequently, the hollow fiber membrane was immersed in water for 30 minutes to be swollen. Then, the hollow fiber membrane was immersed in a 20% by mass aqueous NaOH solution at 70° C. for 1 hour, and further, water washing was repeated to extract and remove silica fine powder to obtain a hollow fiber membrane of Example 4. Composition, production conditions and various properties of the resulting porous membrane of Example 4 are shown in Table 1.

Comparative Example 1

A membrane was formed in the same manner as in Example 1, except for setting bis(2-ethylhexyl)phthalate to 33.8% by mass and dibutyl phthalate to 6.8% by mass, to obtain a hollow fiber membrane of Comparative Example 1. Composition, production conditions and various properties of the resulting porous membrane of Comparative Example 1 are shown in Table 2.

Comparative Example 2

A membrane was formed in the same manner as in Example 1, except for setting the polymer concentration in the inner layer to 34% by mass, bis(2-ethylhexyl)phthalate to 33.8% by mass and dibutyl phthalate to 6.8% by mass, to obtain a hollow fiber membrane of Comparative Example 2. Composition, production conditions and various properties of the resulting porous membrane of Comparative Example 2 are shown in Table 2.

Comparative Example 3

A membrane was formed in the same manner as in Example 2, except for using silica fine powder in the outer layer having a primary particle diameter of 30 nm, to obtain a hollow fiber membrane of Comparative Example 3. Composition, production conditions and various properties of the resulting porous membrane of Comparative Example 3 are shown in Table 2.

Comparative Example 4

A membrane was formed in the same manner as in Example 1, except for setting the polymer concentration in the outer layer to 40% by mass, the silica concentration to 23% by mass, bis(2-ethylhexyl)phthalate to 24.7% by mass and dibutyl phthalate to 12.3% by mass, to obtain a hollow fiber membrane of Comparative Example 4. Composition, production conditions and various properties of the resulting porous membrane of Comparative Example 4 are shown in Table 2.

Comparative Example 5

A membrane was formed in the same manner as in Example 1, except for setting the idle running distance to 300 mm, to obtain a hollow fiber membrane of Comparative Example 5. Composition, production conditions and various properties of the resulting porous membrane of Comparative Example 5 are shown in Table 2.

As described above, it can be seen that a membrane that can secure a fine pore diameter of 300 nm or less, a surface porosity of 32% or more, and a compressive strength of 0.7 MPa or more is excellent in fouling resistance, and has high water permeability retention.

TABLE 1

| | Example 1 | | Example 2 | |
|---|---|---|---|---|
| | Outer layer | Inner layer | Outer layer | Inner layer |
| Resin | PVDF KF W#1000 34% | PVDF KF W#1000 40% | PVDF KF W#1000 34% | PVDF KF W#1000 40% |
| Additive | Silica fine powder 25.4% Primary particle diameter: 16 nm | Silica fine powder 23% Primary particle diameter: 16 nm | Silica fine powder 25.4% Primary particle diameter: 16 nm | Silica fine powder 23% Primary particle diameter: 30 nm |
| Solvent | DEHP: 27.1% DBP: 13.5% | DEHP: 31.3% DBP: 5.7% | DEHP: 27.1% DBP: 13.5% | DEHP: 30.8% DBP: 6.2% |
| Discharge temperature of membrane-forming stock solution [° C.] | 240 | | 240 | |
| Coagulating liquid | Water | | Water | |
| Temperature of coagulating liquid [° C.] | 30 | | 30 | |
| Idle running distance [mm] | 600 | | 300 | |
| Idle running time [s] | 1.2 | | 0.6 | |
| HSP distance [dPVDF-d solvent] | 7.77 | 7.97 | 7.77 | 7.92 |
| Pore diameter [nm] | 200 | 400 | 200 | 600 |
| Thickness of backbone on surface [μm] | 0.3 | 0.5 | 0.3 | 1.0 |
| Pore structure | Three-dimensional network | Three-dimensional network | Three-dimensional network | Three-dimensional network |
| Pore aspect ratio | 1.2 | 1.5 | 1.2 | 4.5 |
| Surface porosity [%] | 40 | 30 | 40 | 30 |
| Porosity [%] | 75 | 70 | 75 | 70 |
| Water permeability [L/(m$^2$ · h)] | 7,000 | | 7,000 | |
| Compressive strength [MPa] | 0.8 | | 0.8 | |
| Water permeability retention [%] | 90 | | 90 | |

| | Example 3 | | Example 4 | |
|---|---|---|---|---|
| | Outer layer | Inner layer | Outer layer | Inner layer |
| Resin | PVDF KF W#1000 34% | PVDF KF W#1000 40% | PVDF KF W#1000 34% | Braid made of polyester |
| Additive | Silica fine powder 25.4% Primary particle diameter: 7 nm | Silica fine powder 23% Primary particle diameter: 30 nm | Silica fine powder 25.4% Primary particle diameter: 7 nm | |
| Solvent | DEHP: 27.1% DBP: 13.5% | DEHP: 30.8% DBP: 6.2% | DEHP: 27.1% DBP: 13.5% | |
| Discharge temperature of membrane-forming stock solution [° C.] | 240 | | 240 | |
| Coagulating liquid | Water | | Water | |
| Temperature of coagulating liquid [° C.] | 30 | | 30 | |
| Idle running distance [mm] | 300 | | 200 | |
| Idle running time [s] | 0.6 | | 0.4 | |
| HSP distance [dPVDF-d solvent] | 7.77 | 7.92 | 7.77 | |
| Pore diameter [nm] | 150 | 600 | 150 | 10,000 |
| Thickness of backbone on surface [μm] | 0.3 | 1.0 | 0.3 | 30.0 |
| Pore structure | Three-dimensional network | Three-dimensional network | Three-dimensional network | |
| Pore aspect ratio | 1.2 | 4.5 | 1.2 | |
| Surface porosity [%] | 40 | 30 | 40 | |
| Porosity [%] | 75 | 70 | 75 | |
| Water permeability [L/(m$^2$ · h)] | 6,000 | | 8,500 | |
| Compressive strength [MPa] | 0.8 | | 0.8 | |
| Water permeability retention [%] | 90 | | 90 | |

TABLE 2

| | Comparative Example 1 | | Comparative Example 2 | | Comparative Example 3 | |
|---|---|---|---|---|---|---|
| | Outer layer | Inner layer | Outer layer | Inner layer | Outer layer | Inner layer |
| Resin | PVDF KF W#1000 34% | PVDF KF W#1000 40% | PVDF KF W#1000 34% | PVDF KF W#1000 34% | PVDF KF W#1000 34% | PVDF KF W#1000 40% |
| Additive | Silica fine powder 25.4% Primary particle diameter: 16 nm | Silica fine powder 23% Primary particle diameter: 16 nm | Silica fine powder 25.4% Primary particle diameter: 16 nm | Silica fine powder 25.4% Primary particle diameter: 16 nm | Silica fine powder 25.4% Primary particle diameter: 30 nm | Silica fine powder 23% Primary particle diameter: 30 nm |
| Solvent | DEHP: 33.8% DBP: 6.8% | DEHP: 31.3% DBP: 5.7% | DEHP: 27.1% DBP: 13.5% | DEHP: 33.8% DBP: 6.8% | DEHP: 27.1% DBP: 13.5% | DEHP: 30.8% DBP: 6.2% |
| Discharge temperature of membrane-forming stock solution [° C.] | 240 | | 240 | | 240 | |
| Coagulating liquid | Water | | Water | | Water | |
| Temperature of coagulating liquid [° C.] | 30 | | 30 | | 30 | |
| Idle running distance [mm] | 600 | | 600 | | 300 | |
| Idle running time [s] | 1.2 | | 1.2 | | 0.6 | |
| HSP distance [dPVDF-d solvent] | 7.92 | 7.97 | 7.77 | 7.92 | 7.77 | 7.92 |
| Pore diameter [nm] | 350 | 400 | 200 | 600 | 400 | 600 |
| Thickness of backbone on surface [μm] | 0.3 | 0.5 | 0.3 | 0.3 | 0.8 | 1.0 |
| Pore structure | Three-dimensional network | Three-dimensional network | Three-dimensional network | Three-dimensional network | Three-dimensional network | Three-dimensional network |
| Pore aspect ratio | 1.2 | 1.2 | 1.3 | 1.2 | 15 | 5 |
| Surface porosity [%] | 40 | 30 | 40 | 30 | 40 | 30 |
| Porosity [%] | 75 | 70 | 75 | 70 | 75 | 70 |
| Water permeability [L/(m² · h)] | 8,000 | | 8,000 | | 12,000 | |
| Compressive strength [MPa] | 0.8 | | 0.5 | | 0.8 | |
| Water permeability retention [%] | 60 | | 60 | | 60 | |

| | Comparative Example 4 | | Comparative Example 5 | |
|---|---|---|---|---|
| | Outer layer | Inner layer | Outer layer | Inner layer |
| Resin | PVDF KF W#1000 40% | PVDF KF W#1000 34% | PVDF KF W#1000 34% | PVDF KF W#1000 40% |
| Additive | Silica fine powder 23% Primary particle diameter: 16 nm | Silica fine powder 23% Primary particle diameter: 16 nm | Silica fine powder 25.4% Primary particle diameter: 16 nm | Silica fine powder 23% Primary particle diameter: 16 nm |
| Solvent | DEHP: 24.7% DBP: 12.3% | DEHP: 31.3% DBP: 5.7% | DEHP: 27.1% DBP: 13.5% | DEHP: 31.3% DBP: 5.7% |
| Discharge temperature of membrane-forming stock solution [° C.] | 240 | | 240 | |
| Coagulating liquid | Water | | Water | |
| Temperature of coagulating liquid [° C.] | 30 | | 30 | |
| Idle running distance [mm] | 600 | | 300 | |
| Idle running time [s] | 1.2 | | 0.6 | |
| HSP distance [dPVDF-d solvent] | 7.77 | 7.97 | 7.77 | 7.97 |
| Pore diameter [nm] | 200 | 400 | 200 | 400 |
| Thickness of backbone on surface [μm] | 0.3 | 0.5 | 0.3 | 0.5 |
| Pore structure | Three-dimensional network | Three-dimensional network | Three-dimensional network | Three-dimensional network |
| Pore aspect ratio | 1.2 | 1.2 | 1.2 | 1.5 |
| Surface porosity [%] | 30 | 30 | 40 | 30 |
| Porosity [%] | 70 | 70 | 75 | 70 |
| Water permeability [L/(m² · h)] | 8,000 | | 6,700 | |
| Compressive strength [MPa] | 0.8 | | 0.6 | |
| Water permeability retention [%] | 60 | | 60 | |

INDUSTRIAL APPLICABILITY

According to the present invention, a porous hollow fiber membrane capable of maintaining stable filtering capacity over a sufficiently long period of time can be provided.

REFERENCE SIGNS LIST

1a: Layer (other layer)
1b: Layer (one layer)
10, 20: Porous hollow fiber membrane
FA, FB: Surface

What is claimed is:

1. A stretched porous hollow fiber membrane containing a polyvinylidene fluoride thermoplastic resin, comprising:
   a first layer; and
   a second layer, wherein
   the second layer, which is an outer layer, has a surface porosity of 32% or more and a pore diameter of 300 nm or less,
   the stretched membrane has a compressive strength of 0.7 MPa or more, and
   the first layer has a surface porosity of 25% to 35% and a pore diameter of 300 nm to 600 nm.

2. A stretched porous hollow fiber membrane according to claim 1, wherein the first layer has a surface porosity of 25% to 32%.

3. A stretched porous hollow fiber membrane according to claim 1, wherein the first layer has a surface porosity of 25% to 30%.

4. A stretched porous hollow fiber membrane according to claim 1, wherein the first layer has a surface porosity of 30%.

5. A stretched porous hollow fiber membrane according to claim 1, wherein the first layer has a surface porosity of about 30%.

6. A stretched porous hollow fiber membrane according to claim 1, wherein the first layer has a pore diameter of 300 nm to 400 nm.

7. A stretched porous hollow fiber membrane according to claim 6, wherein the first layer has a surface porosity of 25% to 32%.

8. A stretched porous hollow fiber membrane according to claim 6, wherein the first layer has a surface porosity of 25% to 30%.

9. A stretched porous hollow fiber membrane according to claim 6, wherein the first layer has a surface porosity of 30%.

10. A stretched porous hollow fiber membrane according to claim 6, wherein the first layer has a surface porosity of about 30%.

* * * * *